United States Patent Office 3,100,175
Patented Aug. 6, 1963

3,100,175
ANTISEPTIC COMPOSITION
Jean-Pierre Bourquin, Basel, Arthur Brack, Riehen, Erhard Schenker and Rudolf Griot, Basel, and Walter Steffen, Munchenstein, Basel-Land, Switzerland, assignors to Sandoz Ltd., Basel, Switzerland
No Drawing. Filed July 5, 1961, Ser. No. 121,838
Claims priority, application Switzerland July 15, 1960
7 Claims. (Cl. 167—33)

This invention relates to a new and novel antiseptic composition. More particularly it relates to antiseptic compositions containing a synergistic mixture of 5,7-dibromo-8-hydroxyquinoline and a quinaldine derivative of the general Formula I

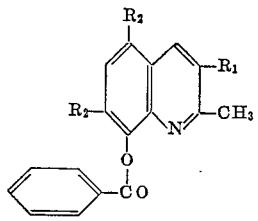

(I)

wherein $R_1$ is selected from the group consisting of hydrogen and methyl and each of the two symbols $R_2$ is selected from the group consisting of a chlorine and bromine atom.

The composition of matter of the present invention may be used in diluted form for disinfecting animate or inanimate surfaces, including the surfaces of the alimentary tract of animals. It will thus be appreciated that preparations embodying the composition of matter will contain, in addition to the two above mentioned active ingredients (i.e. the mentioned quinoline and the mentioned quinaldine), an inert diluent. Useful preparations of this kind include tablets, dusting and spraying powders, salves (e.g., skin salve, eye salve or lip salve), suppositories and liquid sprays based on a liquid inert diluent.

The composition of matter of the invention has antiseptic properties which are superior to the arithmetic total of the antiseptic effect due to each of the two active substances making up the composition of matter of the invention, i.e., the said composition shows a synergistic effect.

While combinations of 5,7-dibromo-8-hydroxyquinoline and 5,7-dibromo-8-benzoyloxyquinaldine are the most effective and exhibit the most pronounced synergistic antiseptic effect, other quinaldine derivatives of the general Formula I also exhibit synergism, e.g.

3-methyl-5,7-dibromo-8-benzoyloxyquinaldine
5,7-dichloro-8-benzoyloxyquinaldine
3-methyl-5,7-dibromo-8-hydroxyquinaldine
3-methyl-5,7-dichloro-8-hydroxyquinaldine The compounds I above may be obtained by reacting a compound of the general Formula II

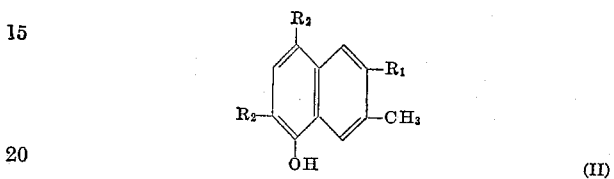

(II)

wherein $R_1$ and $R_2$ have the above significance with benzoyl chloride and/or benzoic acid anhydride.

The composition of matter of the present invention has a relatively low toxicity which is sufficiently low to enable its use in medicine; no appreciable resorption takes place, since the said composition is practically insoluble in water.

Apart from using the composition of matter of the present invention for the disinfection of animate or inanimate surfaces, it may also be used for impregnating textiles in order to free them from germs and/or to endow them with germ destroying properties. Furthermore, said composition may be used for combating micro-organisms on instruments, apparatus, equipment, furniture and for disinfecting rooms.

As an example the synergistic effect of 5,7-dibromo-8-hydroxy-quinoline with the hitherto unknown 5,7-dihalogeno-8-benzoyloxy-quinaldine having the general Formula I will be reviewed with the help of the results listed in the table. Investigated was the synergistic effect of 5,7-dibromo-8-hydroxy-quinoline (hereafter called A) and 5,7-dibromo - 8 - benzoyloxy - quinaldine (hereafter called B).

In order to test the bacteriostatic action against micro-organisms in vitro of both the components singly as well as in combination serial dilutions of the substances in suitable nutrient solutions were prepared. For gram-positive and gram-negative growths a brain-heart-infusion "Difco" having a pH-value of 7,2 was used; for fungi a nutrient solution consisting of diluted light brewer's wort without hops and having a 2% dry residue, additional 7% glucose and the pH-value of 6.4. The gram-positive and gram-negative serial growths as well as the serial preparations inoculated with Candida albicans were incubated with 37° C. and after 24 hours the minimal concentrations with a total growth-inhibition were determined. The preparations of pathogenic skin-fungi used in investigations were incubated at 22° C. for 3 weeks and then the concentration of the minimal total inhibition of growth was determined.

| 1 | 2 | 3 | 4 | 5 | 6 | 7 | 8 | 9 |
|---|---|---|---|---|---|---|---|---|
| Breed | A, γ/cc. | B, γ/cc. | A+B, γ/cc. | A, γ/cc. | B, γ/cc. | A, percent | B, percent | A+B, percent |
| GRAM-POSITIVE GROWTHS | | | | | | | | |
| Str. pyog | 4.74 | 0.33 | 0.99 | 0.83 | 0.16 | 18 | 48 | 66 |
| Str. faec | 12.1 | 16.8 | 9.90 | 8.26 | 1.64 | 68 | 10 | 78 |
| Bac. subst | 7.6 | 0.52 | 1.27 | 1.06 | 0.21 | 14 | 40 | 54 |
| GRAM-NEGATIVE GROWTHS | | | | | | | | |
| E. coli | 30 | ¹>105 | 12.7 | 10.6 | 2.1 | 35 | ≤1 | 36 |
| Kl. pneum | 47 | >105 | 19.8 | 16.5 | 3.3 | 35 | ≤2 | 37 |
| S. ent | 30 | >105 | 15.9 | 13.3 | 2.6 | 44 | ≤2 | 46 |
| S. typh | 30 | >105 | 9.9 | 8.3 | 1.6 | 28 | ≤1 | 29 |
| S. paraty | 12 | >105 | 9.9 | 8.3 | 1.6 | 69 | ≤1 | 70 |
| Styphim | 30 | >105 | 19.8 | 16.5 | 3.3 | 55 | ≤2 | 57 |
| Sh. sonnei | 30 | >105 | 12.7 | 10.6 | 2.1 | 35 | ≤1 | 36 |
| Vib. el T | 7.6 | 1.68 | 3.97 | 3.32 | 0.65 | 43 | 39 | 82 |
| FUNGI | | | | | | | | |
| Cand. alb | 1.21 | 3.3 | 0.63 | 0.53 | 0.10 | 44 | 3 | 47 |
| Cand. alb | 1.44 | 6.6 | 0.79 | 0.66 | 0.13 | 46 | 2 | 48 |
| K 3 beeryeast | 0.76 | 0.84 | 0.45 | 0.38 | 0.07 | 50 | 8 | 58 |
| Tr. interd | 1.21 | 4.2 | 0.79 | 0.66 | 0.13 | 55 | 3 | 58 |
| Tr. rubrum | 0.61 | 2.1 | 0.49 | 0.41 | 0.08 | 68 | 4 | 72 |
| Tr. ment | 0.95 | 4.2 | 0.63 | 0.53 | 0.10 | 56 | 2 | 58 |
| Tr. gyps | 0.76 | 4.2 | 0.79 | 0.66 | 0.13 | 88 | 3 | 91 |
| Tr. gall | 0.76 | 4.2 | 0.49 | 0.41 | 0.08 | 54 | 2 | 56 |
| Asp. nig | 0.76 | 8.4 | 0.79 | 0.66 | 0.13 | 87 | 2 | 89 |

¹ That is having no effect at 105 γ/cc., higher concentrations being insoluble. Therefore, in the calculation of the amounts of components in percentages the inhibiting concentration of the component concerned we employed the next highest level of concentration, i.e. 166 γ/cc. and the resulting percentage was marked "≤."

The table shows in columns 2 and 3 which concentrations depicted in γ/cc. of component A or B resp. of the combination had to be employed singly in order to achieve total growth inhibition of the micro-organisms. In column 4 is shown the concentration of a mixture of 7 mols A and 1 mol B needed for total inhibition of growth. Columns 5 and 6 show the absolute concentrations of components A and B resp. in this combination. Column 7 shows what percentage of the total growth inhibiting concentration of component A (according to col. 2) is contained in the combination whereas column 8 gives the value concerned for component B. Column 9 indicates the arithmetical sum of these percentages. Should the effects of the single components in the combination be mutually complemented purely additively then the sum of these must be 100%. Since these sums are under 100% for the micro-organisms mentioned here, it shows that through the combination there is a potentiation of effects of the single components, that is, a synergistic effect takes place.

The composition of matter of the present invention is practically colourless, odourless and tasteless. Furthermore, it contains no iodine and may therefore be used in cases where the presence of iodine, whether in combined or free form, is undesirable.

With the composition of matter of the present invention, best results are obtained when from 4 to 9 mols of the quinoline for every mol of the quinaldine are present. However, the present invention also includes those compositions wherein there are higher proportions of the quinoline, for example 0.05 mol for each mol of quinaldine, are present.

Optimum conditions in preparations containing, in addition to an inert diluent, the composition of matter of the present invention, which preparations are useful for disinfecting surfaces in animals, prevail when 7 mols of quinoline are present for every mol of quinaldine.

Preferably the preparations containing the composition of matter ready for use are composed of from 1 to 60% by weight of active substances (i.e. quinaldine and quinoline), the remainder being inert diluent of which the nature depends on the final use of the preparations; however, it is also within the scope of the present invention to provide preparations containing lesser quantities (for example 99.9% by weight) of active substances. The actual choice of the diluent for specific preparations containing the composition of matter of the invention is well understood by persons skilled in this subject.

The present invention also provides a process for disinfecting a surface, characterized in that said surface is contacted with a composition of matter comprising 5,7-dibromo-8-hydroxyquinoline and a quinaldine derivative of the general Formula I.

The following four procedures show the production of those of the active ingredients used in the composition of matter of the present invention, which active ingredients had not hitherto been described in the literature on the subject; temperatures are stated in degrees centigrade.

PROCEDURE 1

*5,7-Dibromo-8-Benzoyloxy Quinaldine*

31.6 g. of benzoyl chloride (B.P. 194 to 196°) are added portionwise to a solution of 47.5 g. of 5,7-dibromo-8-hydroxy quinaldine (M.P. 125 to 126°) in 100 cc. of pyridine, the solution being cooled on ice and shaken. The mixture is then allowed to stand at room temperature for three hours and evaporated at the water pump at 40° until dry. The residue is made into a paste with 100 cc. of ice water, 200 cc. of chloroform are added, and the chloroform portion is shaken out twice with 100 cc., i.e. with a total of 200 cc. of a 10% aqueous solution of bicarbonate of soda. After having been twice washed out with 25 cc., i.e. with a total of 50 cc. of water, the chloroform portion is dried over sodium sulphate, concentrated at the water pump, and then yields crude 5,7-dibromo-8-benzoyloxy quinaldine of M.P. 124 to 130°. After repeated recrystallisation of the substance from a mixture of benzene and petroleum ether, analytically pure 5,7-dibromo-8-benzoyloxy quinaldine is obtained which has a constant M.P. of 130 to 132°.

PROCEDURE 2

*5,7-Dichloro-8-Benzoyloxy Quinaldine*

32.7 g. of benzoyl chloride are added portionwise to a solution of 34.2 g. of 5,7-dichloro-8-hydroxyquinaldine (M.P. 111 to 112°) in 100 cc. of pyridine whilst this is being cooled on ice and shaken. The mixture is allowed to stand at room temperature for 4 hours and is then concentrated in a vacuum at 40° until dry. The residue is triturated in 100 cc. of iced water. 250 cc. of chloroform are added and the chloroform portion is then shaken out twice, each time with 100 cc. of a 5% aqueous solution of bicarbonate of soda. After having been twice washed with 25 cc. of water, the chloroform portion is dried over sodium sulphate and concentrated in vacuo, yielding raw 5,7-dichloro-8-benzoyloxy quinaldine of M.P. 118 to 121°. Repeated recrystallisation of the substance from petroleum ether produces the analytically pure 5,7-dichloro-8-benzoyloxy quinaldine of constant M.P. 121 to 123°.

PROCEDURE 3

*3-Methyl-5,7-Dibromo-8-Hydroxy Quinaldine*

A solution of 10.0 g. of 3-methyl-8-hydroxy quinaldine (M.P. 91 to 92°), prepared by condensation of o-aminophenol with α-methylcrotonaldehyde, in 60 cc. of an 85% aqueous formic acid solution is cooled to about 0° and, whilst being stirred, 24 g. of bromine are added thereto in the course of 5 hours. The reaction mixture is diluted with 120 cc. of water, 120 cc. of a 20% solution of sodium bisulphite are added and stirring is continued for another hour. The product is collected on a suction filter, washed with about 2 litres of water, dried on earthenware plates and crystallised from absolute alcohol. Recrystallisation from absolute alcohol produces the analytically pure 3-methyl-5,7-dibromo-8-hydroxyquinaldine of M.P. 148 to 149°.

PROCEDURE 4

*3-Methyl-5,7-Dibromo-8-Benzoyloxy Quinaldine*

0.64 g. of benzoyl chloride are added to a solution of 1.0 g. of 3-methyl-5,7-dibromo-8-hydroxy quinaldine in 2.0 cc. of pyridine, whilst cooling on an ice bath. The mixture is allowed to stand at room temperature for 17 hours and then evaporated in vacuo until dry. 5 cc. of iced water are added to the evaporation residue and chloroform extraction is effected. After having been washed with a solution of sodium hydrogen carbonate the extract is dried over sodium sulphate and boiled down in vacuo. The analytically pure recrystallised 3-methyl-5,7-dibromo-8-benzoyloxy quinaldine melts at 168.5 to 169.5°.

The following examples illustrate the invention without, however, limiting it. All parts are parts by weight.

EXAMPLE 1.—TABLETS

Active substances:

| | Parts |
|---|---|
| 5,7-dibromo-8-hydroxy quinoline | 49.21 |
| 5,7-dibromo-8-benzoyloxy quinaldine | 9.72 |
| Magnesium stearate | 0.48 |
| Gelatine | 0.95 |
| Silicic acid, highly dispersed, amorphous | 1.91 |
| Stearic acid | 2.86 |
| Talcum | 4.76 |
| Maize starch | 14.76 |
| Lactose, ad. 100.00. | |

The active substances are mixed with the silicic acid, the lactose, and part of the maize starch and stearic acid, and the mixture is granulated moist with the gelatine. The magnesium stearate, the talcum and the remaining stearic acid and maize starch are added to the dried granulate and the mixture is compressed into tablets.

EXAMPLE 2.—DUSTING POWDER (a) Active substances:

| | Parts |
|---|---|
| 5,7-dibromo-8-hydroxy quinoline | 8.26 |
| 5,7-dibromo-8-benzoyloxy quinaldine | 1.64 |
| Silicic acid, high dispersed, amorphous | 5.00 |
| Talcum, purified (free from Fe), ad. 100.00. | |

The active substances are mixed with the additives and the mixture is passed through a 36–40/cm. mesh screen.

(b) Active substances:

| | Parts |
|---|---|
| 5,7-dibromo-8-hydroxy quinoline | 3.69 |
| 5,7-dibromo-8-benzoyloxy quinaldine | 1.26 |
| Silicic acid, highly dispersed, amorphous | 5.00 |
| Talcum, purified (free from Fe), ad. 100.00. | |

The active substances are mixed with the additives and the mixture passed through a 36–40/cm. mesh screen.

EXAMPLE 3.—SALVES (a) Active substances:

| | Parts |
|---|---|
| 5,7-dibromo-8-hydroxy quinoline | 8.26 |
| 5,7-dibromo-8-benzoyloxy quinaldine | 1.64 |
| Fat stabiliser | 0.10 |
| Glycerine monostearate | 0.20 |
| Polyoxyethylenesorbitane monostearate | 1.00 |
| Wool fat | 4.00 |
| Silicic acid, highly dispersed, amorphous | 7.00 |
| Isopropyl myristate | 18.00 |
| Oleic acid oleyl ester | 20.00 |
| Ground nut oil, ad. 100.00. | |

The active substances are formed into a paste with a like weight of ground nut oil. The fat stabiliser, the glycerine monostearate, the polyoxyethylene sorbitane monostearate and the wool fat are melted down together. The isopropyl myristate, the oleic acid oleyl ester and the remainder of the ground nut oil are added to the melt. The active paste and the silica are then consecutively distributed in the fatty melt. Finally, the salve is homogenised.

(b) Active substances:

| | Parts |
|---|---|
| 5,7-dibromo-8-hydroxy quinoline | 2.21 |
| 5,7-dibromo-8-benzoyloxy quinaldine | 0.76 |
| Distilled water | 10.00 |
| Polyethylene glycol 4000 | 25.00 |
| Polyethylene glycol 400, ad. 100.00. | |

The active substances are made into a paste with a quantity of like weight of polyethylene glycol 400. The polyethylene glycol 4000 and the remainder of the polyethylene glycol 400 are melted down together. The distilled water and the pastified active substances are then added. The salve is finally homogenised.

EXAMPLE 4.—SUPPOSITORIES (a) Active substances:

| | Parts |
|---|---|
| 5,7-dibromo-8-hydroxy quinoline | 0.99 |
| 5,7-dibromo-8-benzoyloxy quinaldine | 0.13 |
| Food dye, fat-soluble | 0.27 |
| Neutral fats (M.P. about 36°), ad. 100.00. | |

The active substances are suspended in the molten dyed neutral fat. The suspension is cast into moulds at a temperature of 35–36°.

(b) Active substances:

| | Parts |
|---|---|
| 5,7-dibromo-8-hydroxy quinoline | 2.47 |
| 5,7-dibromo-8-benzoyloxy quinaldine | 0.50 |
| Silicic acid, highly dispersed, amorphous | 0.05 |
| Polyethylene glycol 1000, ad. 100.00. | |

The active substances and the silicic acid are mixed. The mixture is suspended in the molten polyethylene glycol. The suspension is then cast into moulds at a temperature of 35–36°.

EXAMPLE 5.—SPRAY

Active substances:

| | Parts |
|---|---|
| 5,7-dibromo-8-hydroxy quinoline | 3.89 |
| 5,7-dibromo-8-benzoyloxy quinaldine | 1.05 |
| Sodium-carboxy methylcellulose | 1.00 |
| Sorbitol, 70% in water | 8.00 |
| Distilled water, ad. 100.00. | |

The active substances are made into a paste with the 70% sorbitol. A solution of the sodium-carboxy methylcellulose in water is then added and the suspension homogenised.

EXAMPLE 6.—TABLETS

| Active substances: | Parts |
|---|---|
| 5,7-dibromo-8-hydroxy quinoline | 49.11 |
| 5,7-dibromo-8-benzoyloxy quinaldine | 9.82 |
| Magnesium stearate | 0.48 |
| Gelatine | 0.95 |
| Silicic acid, highly dispersed, amorphous | 1.91 |
| Stearic acid | 2.86 |
| Talcum | 4.76 |
| Maize starch | 14.76 |
| Lactose, ad. 100.00. | |

The active substances are mixed with the silicic acid, the lactose and part of the maize starch and stearic acid, and the mixture is then granulated moist. The magnesium stearate, the talcum and the remainder of the stearic acid and maize starch are added to the dried granulate and the mixture is compressed into tablets.

EXAMPLE 7.—TABLETS

| Active substances: | Parts |
|---|---|
| 5,7-dibromo-8-hydroxy quinoline | 50.95 |
| 5,7-dichloro-8-benzoyloxy quinaldine | 7.98 |
| Magnesium stearate | 0.48 |
| Gelatine | 0.95 |
| Silicic acid, highly dispersed, amorphous | 1.91 |
| Stearic acid | 2.86 |
| Talcum | 4.76 |
| Maize starch | 14.76 |
| Lactose, ad. 100.00. | |

The active substances are mixed with the silicic acid, the lactose and part of the maize starch and stearic acid, and the mixture is then granulated moist with the gelatine. The magnesium stearate, the talcum and the remainder of the stearic acid and maize starch are added to the dried granulate and the mixture is compressed into tablets.

EXAMPLE 8.—TABLETS

| Active substances: | Parts |
|---|---|
| 5,7-dibromo-8-hydroxy quinoline | 48.86 |
| 3-methyl-5,7-dibromo-8-benzoyloxy quinaldine | 10.07 |
| Magnesium stearate | 0.48 |
| Gelatine | 0.95 |
| Silicic acid, highly dispersed, amorphous | 1.91 |
| Stearic acid | 2.86 |
| Talcum | 4.76 |
| Maize starch | 14.76 |
| Lactose, ad. 100.00. | |

The active substances are mixed with the silicic acid, the lactose and part of the maize starch and the stearic acid, and the mixture is then granulated moist with the gelatine. The magnesium stearate, the talcum and the remainder of the stearic acid and maize starch are added to the dried granulate and the mixture is compressed into tablets.

Having thus disclosed the invention, what is claimed is:

1. An antifungal and antibacterial composition of matter comprising 5,7-dibromo-8-hydroxyquinoline and a quinaldine derivative of the general Formula I as active ingredients,

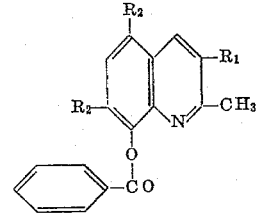

wherein $R_1$ is selected from the group consisting of hydrogen and methyl and each of the two symbols $R_2$ is selected from the group consisting of chlorine and bromine, there being present from 4 to 9 mols of said quinoline to 1 mol of said quinaldine derivative.

2. A composition of matter as claimed in claim 1 wherein 5,7-dibromo-8-benzoyloxyquinaldine is mixed with 5,7-dibromo-8-hydroxyquinoline.

3. Tablets containing, in addition to an inert diluent, the composition of matter claimed in claim 1.

4. A powder containing, in addition to an inert diluent, a composition claimed in claim 1.

5. Suppositories containing, in addition to an inert carrier, a composition claimed in claim 1.

6. A spray consisting of a liquid having suspended therein the composition claimed in claim 1 in finely divided form.

7. A salve consisting of a salve base containing the composition of matter claimed in claim 1.

References Cited in the file of this patent

UNITED STATES PATENTS

| 2,411,670 | Senn | Nov. 26, 1946 |
| 2,666,058 | Neher | Jan. 12, 1954 |

FOREIGN PATENTS

| 776,223 | Great Britain | June 5, 1957 |
| 791,409 | Great Britain | Mar. 5, 1958 |

OTHER REFERENCES

Nogradi: Chemische Berichte, vol. 85, pages 104–106, 1952.